United States Patent [19]

Roza

[11] 3,920,932

[45] Nov. 18, 1975

[54] COAXIAL CABLE INCLUDING LINE REPEATERS FOR BROADBAND SIGNALS

[75] Inventor: Engel Roza, Emmasingel, Eindhoven, Netherlands

[73] Assignee: U.S. Philips Corporation, New York, N.Y.

[22] Filed: Aug. 20, 1974

[21] Appl. No.: 499,065

[30] Foreign Application Priority Data

Aug. 25, 1973 Netherlands ....................... 7311734

[52] U.S. Cl. ........................... 179/170 R; 174/70 S

[51] Int. Cl.² ........................................ H04B 3/36

[58] Field of Search ......... 179/170 R, 170 J, 170 T; 174/70 S; 333/84 R, 84 M, 97 R

[56] References Cited

UNITED STATES PATENTS

| | | | |
|---|---|---|---|
| 3,065,297 | 11/1962 | Wrathall | 179/170 T |
| 3,582,576 | 6/1971 | Mosman | 179/170 R |
| 3,610,812 | 10/1971 | Furusawa | 333/84 R |
| 3,786,375 | 1/1974 | Sato et al. | 333/97 R |
| 3,816,673 | 6/1974 | Miya | 179/170 R |

*Primary Examiner*—William C. Cooper
*Assistant Examiner*—Randall P. Myers
*Attorney, Agent, or Firm*—Frank R. Trifari; George B. Berka

[57] ABSTRACT

A coaxial cable comprising line repeaters, tubular ferromagnetic members coaxially mounted on the inner conductor to create electrical interruptions in the mechanically uninterrupted cable, and coupling means between the electrically interrupted portions of the cable and the line repeaters.

7 Claims, 3 Drawing Figures

COAXIAL CABLE INCLUDING LINE REPEATERS FOR BROADBAND SIGNALS

The invention relates to a coaxial cable including an inner conductor and an outer conductor and line repeaters having a pair of input and output terminals, said line repeater being located within the outer conductor and coupled to the inner conductor for amplifying signals in a broad frequency band to be transmitted through the coaxial cable.

In modern telecommunication systems in which, for example, pulse code-modulated telephony signals are transmitted in time division multiplex the aim is to continuously increase the number of channels signals, i.e., signals originating from different channels which can be transmitted through one and the same coaxial cable. The enlargement of the bandwidth of the signal to be transmitted in conjunction with this increase of the number of channel signals results, however, in the mutual distance between the line repeaters used being greatly decreased. By using line repeaters which can be included within the coaxial cable and can therefore be formed in an integrated manner and due to this integration only have a limited performance (for example, only a limited amplification), said mutual distance between the line repeaters is, however, further reduced. For transmission of signals in a frequency band of several hundred MHz this mutual distance is only several hundred meters. As compared with a carrier telephony system in which the signals are transmitted in a frequency band of, for example, 60 MHz this means that there is a reduction of the mutual distance between the line repeaters by, for example, a factor of 10.

Since the connection of a line repeater to the coaxial cable always goes together with the mechanical interruption of the inner conductors of the cable, the mechanical strength of the cable is considerably decreased due to the slight mutual distance and the large number of required integrated line repeaters.

It is known to inhibit this decrease in mechnical strength in cables including a given number of so-called coaxial wire pairs by incorporating centrally in the wire a steel cable having a high tensile strength.

An object of the invention is to inhibit the decrease in mechanical strength of the coaxial cable in another manner and separately for each coaxial cable.

According to the invention each of these line repeaters is coupled to the inner conductor without a mechanical interruption of the inner conductor and at respective cable sections assigned to the line repeaters an annular or tubular ferromagnetic element is secured to the inner conductor and coaxially with this inner conductor, the ferromagnetic element being formed in such a manner that they bring about an electrical interruption of the inner conductor for the signals in the said broad frequency band. At the locations of the line repeaters the coaxial cable furthermore includes means to derive the signal occurring before said annular or tubular element from the inner conductor and apply it to the line repeater and means to derive the amplified signal from the line repeater and apply it to the inner conductor immediately following the said annular or tubular element, while the said electrical interruption of the inner conductor is bridged by the line repeater.

By using the steps according to the invention it is achieved that the direct current path for the supply current of the repeaters is not interrupted and additionally a reflection-free closure is obtained of both the input and the output of the line repeater over the entire broad frequency band of the signals to be transmitted.

The invention and its advantages will now be described in greater detail with reference to the drawings, in which.

Figure 1:
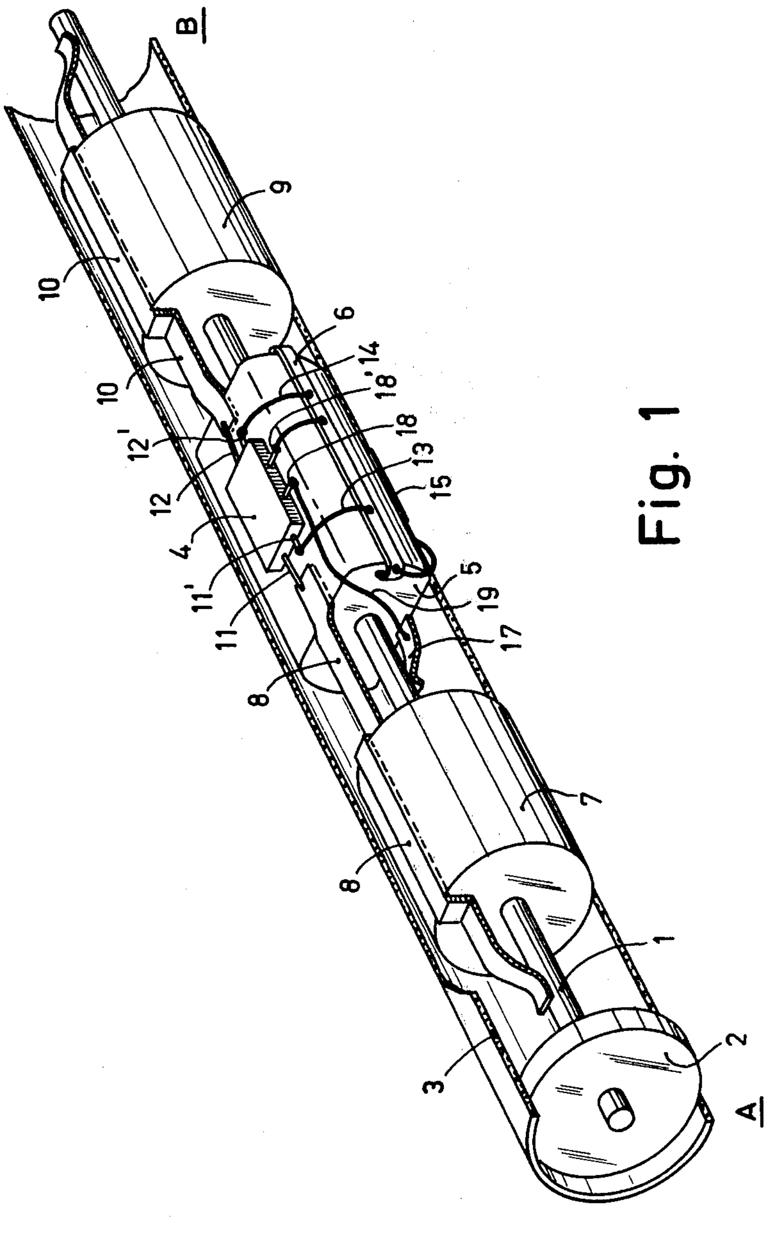
FIG. 1 shows a coaxial cable section according to the invention at the location of a line repeater.

FIG. 1 shows a coaxial cable consisting of an inner conductor 1 and an outer conductor 3, only partly show, concentrically supported about the inner conductor by means of dielectric discs 2. The cable is used for the transmission, for example, in time division multiplex of pulse code-modulated telephon signals in the direction from A to B in which the signal to be transmitted takes up a frequency band of, for example, 10 to 300 MHz.

To amplify these signals to be transmitted through the cable, a number of line repeaters 4 are connected to this cable only one of which is shown for the sake of simplicity. More particularly in the transmission of said pulse code-modulated signals these line repeaters are constituted by so-called regenerative repeaters. Not only is the incoming signal amplified by these repeaters, but also a variation in the instant of occurrence and in the shape of the pulses of the pulse signal is accurately restored. These line repeaters are preferably formed as integrated circuits whose dimensions are so small that they can be provided within the outer conductor of the coaxial cable already during the manufacturing of the latter.

In the embodiment shown the regenerative repeater 4 formed as an integrated circuit is provided on a support 5 of, for example, ceramic material which is likewise incorporated within the outer conductor and is clamped by means of a resilient element 6 against the outer conductor.

As is known the mutual distance between two successive line repeaters in such a coaxial cable is determined on the one hand by the width the frequency band in which the signals are transmitted and on the other hand by the quality and also the performance of the line repeaters (for example, the value of the admissible amplification). Since only a limited performance of the line repeaters may be expected due to their integrated structure, because line repeaters suitable for integration have to be simple in structure, the mutual distance of two successive line repeaters is very limited also due to the required broad frequency band of, for example, 300 MHz and is, for example, only 150 to 200 meters.

In practice the said short mutual distance and the resulting high number of line repeaters for covering conventional transmission distances of, for example, 60 km detrimentally influence the mechanical strength of the cable. According to the invention this disadvantage is avoided because each of the line repeaters 4 is coupled to the inner conductor without mechanical interruption of the inner conductor and because at least one annular or tubular ferromagnetic element 7 is coaxially coupled to the inner conductor and secured thereto near a line repeater 4. This ferromagnetic element is formed in such a manner that it brings about an electrical interruption of the inner conductor for the data signals to be transmitted in this broad frequency band and the coaxial cable section assigned to each line repeater includes means to derive the signal occurring before this annular or tubular element 7 from the inner conductor and apply it to the line repeater, and means to derive the amplified signal from the line repeater and apply it to the inner conductor immediately following this annular or tubular ferromagnetic element, while the said electrical interruption of the inner conductor is bridged by the line repeater.

In the embodiment shown in FIG. 1 not only the element 7 but also a second annular or tubular ferromagnetic element 9 is coaxially secured to the inner conductor. Also this ferromagnetic element is formed in such a manner that it brings about an electrical interruption of the inner conductor for the data signals to be transmitted.

In addition to the two ferromagnetic elements 7 and 9 the ceramic material support 5 is secured in the manner shown in the Figure to the inner conductor without a mechanical interruption of this inner conductor.

In this embodiment the ferromagnetic elements 7 and 9 are secured to the inner conductor by means of resilient elements 8 and 10 which, as is shown in the Figure, are connected at one end to the ceramic material element and at the other end are clamped to the inner conductor 1. Due to its connection to the inner conductor 1 the resilient element 8 in this embodiment is also utilized to apply the data signal to be transmitted through the lead to the line repeater 4 which for this purpose is provided with two input terminals 11 and 11′ whose terminal 11 is connected to the resilient element 8. Correspondingly, due to its connection to the inner conductor the resilient element 10 is also utilized to apply the amplified and regenerated data signal to the inner conductor 1. To this end the line repeater 4 also has two output terminals 12 and 12′ and terminal 12 is connected to the resilient element 10. The terminals 11′ and 12′ are DC coupled through leads 13 and 14 and the resilient elements 6 to the outer conductor 3 which is connected to ground potential.

The electrical interruption of the inner conductor is brought about, because, as is known, the ferromagnetic elements 7 and 9 operate as an inductor incorporated in the conductor 1 due to the cooperation of the varying magnetic field present within the coaxial lead and the properties of the ferromagnetic material. These inductors are equivalent to a cut-off filter incorporated in the conductor 1. As is known the cut-off characteristic of this filter is obtained by correct choice of the ferromagnetic material and by correct proportioning of the ferromagnetic elements. For the data signals to be transmitted in the said broad frequency band of 10 to 300 MHz elements may be used, for example, of the type ferruxplana $\mu$ = approximately 35 with a length of, for example, 1.5 cm.

Thus, without mechanical interruption of the inner conductor an electrical interruption thereof is brought about which is bridged by the said connection of the line repeater to the inner conductor 1 by this line repeater so that the signals to be transmitted are applied to this line repeater for amplification and regeneration.

Figure 2:
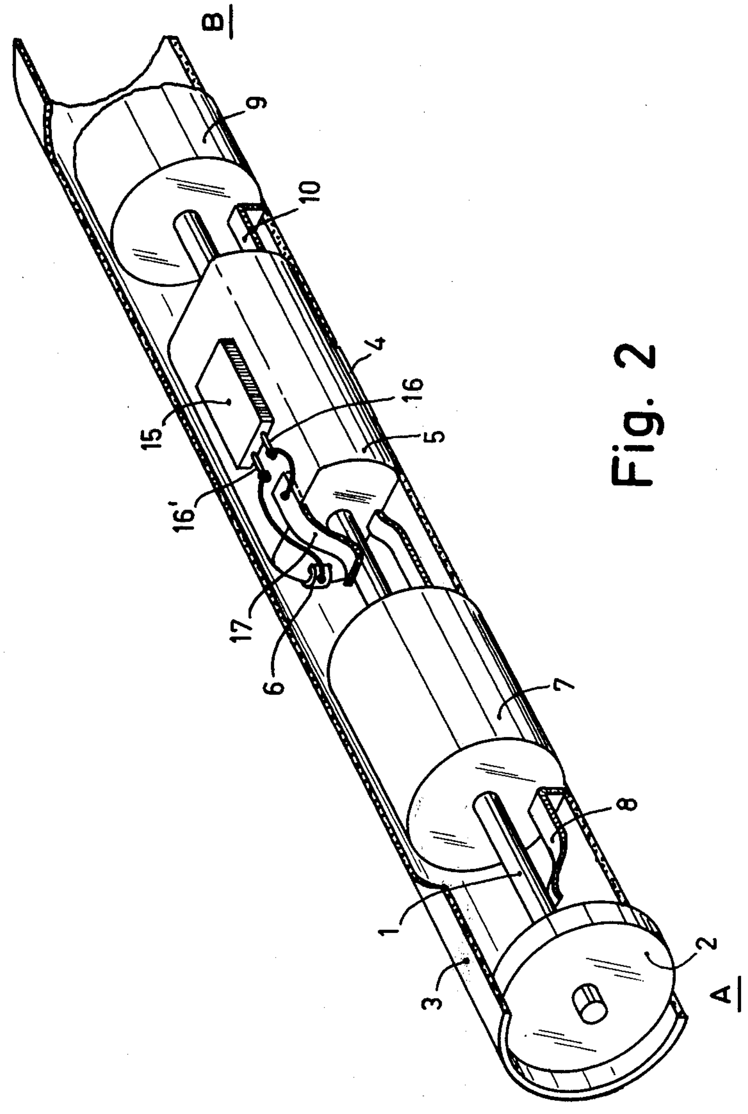
FIG. 2 is a bottom view of the coaxial cable according to FIG. 1.

The cut-off characteristic of the resulting filter may be enhanced by using a capacitor 15, for example, of the ceramic type which is connected in the manner shown in greater detail in FIG. 2 to the section of the inner conductor 1 which is located between the two ferromagnetic elements 7 and 9. In this FIG. 2 in which the elements corresponding to those in FIG. 1 have the same reference numerals the lower side of the support 5 shown in FIG. 1 is mainly shown with the capacitor 15 provided with two connection terminals 16 and 16′, the terminal 16 being connected to a metallic resilient element 17 which is rigidly connected at one end to the support 5 and is DC coupled at the other end to that section of the inner conductor 1 which is located between the ferromagnetic element 7 and the support 5 while furthermore the connection terminal 16′ is connected to ground potential through the resilient element 6.

The use of this capacitor completely eliminates those signals which occur between the two ferromagnet elements 7 and 9 and which are not suppressed or not completely suppressed by those elements. Particularly it is inhibited that the inner conductor 1 can start to operate as a feedback path for the output signals of the line repeater 4.

The ferromagnetic element 9 shown in FIGS. 1 and 2 is not only used for forming together with the capacitor 15 a cut-off filter for the data signals to be transmitted through the coaxial lead in the direction from A to B, but rather for realizing a reflection-free closure of that section of the coaxial cable which immediately follows the ferromagnetic element 9. As a result it is particularly inhibited that signals passing in the direction from B to A and reflected by a line repeater following the line repeater shown occur again at the input of the line repeater 4 so that serious distortions in conjunction with these reflections of the data signal to be transmitted are inhibited.

The use of the steps according to the invention not only results in the line repeaters being coupled to the coaxial lead without mechanical interruption of the cable and therefore without reduction in the mechanical strength of the cable, but it is also achieved that the direct current path for the direct supply current for the line repeaters is not interrupted; in fact, this direct supply current is conventionally transmitted through the inner conductor 1 of the coaxial cable and due to their direct current characteristics it is not suppressed by the ferromagnetic elements presenting themselves as inductors. This direct supply current is applied to the line repeaters in the manner as illustrated in greater detail for the sake of completeness for the line repeaters 4 in the embodiment of FIG. 1. To this end all line repeaters likewise as line repeater 4 are additionally provided with two supply terminals 18 and 18′. The terminal 18 is connected through a lead 19 to the resilient element 17 which is DC-connected to that section of the inner conductor 1 located between the ferromagnetic element 7 and the support 5, while the terminal 18′ is connected to the resilient element 6 and connected to the ground potential through this resilient element.

Figure 3:
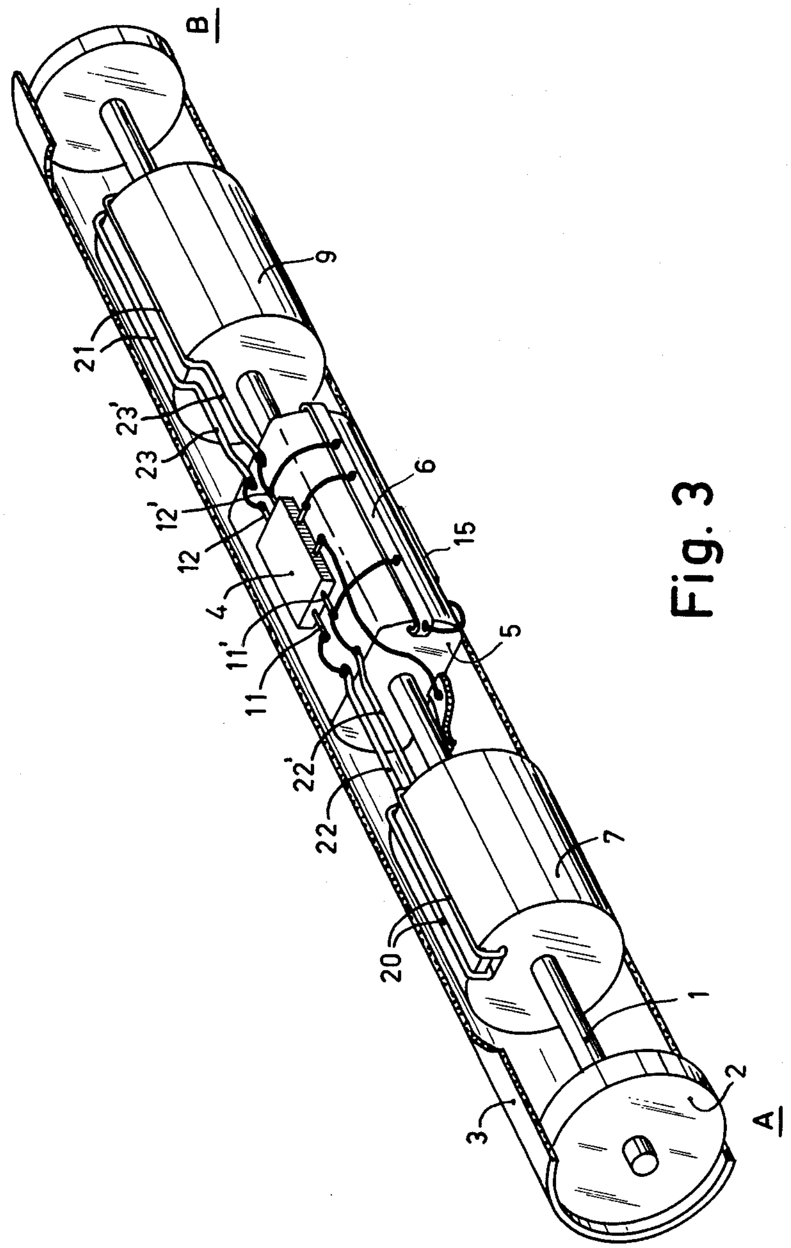
FIG. 3 is a modification of the coaxial cable of this invention.

As is shown in greater detail in FIG. 3 the information signal to be transmited need not only be derived by the resilient elements 8 and 10, but also in another manner from the inner conductor and applied thereto after amplification and possible regeneration.

In FIG. 3 the great part of which corresponds to FIG. 1 elements corresponding to those in FIG. 1 have the same reference numerals. The section shown in this FIG. 3 also consists of a coaxial cable comprising an inner conductor 1, an outer conductor 3 and dielectric disc 2 separating the two conductors 1 and 3. For amplification of the information signal this coaxial cable also uses an integrated line repeater 4 with signal input terminals 11 and 11′ and output terminals 12 and 12′, which repeater is secured by means of, for example, and adhesive to the support 5 of ceramic material likewise secured, for example, by means of an adhesive to the inner conductor 1.

The cut-off filter for the information signals is likewise constituted in this embodiment by an annular or tubular ferromagnetic element 7 which in this embodiment is connected coaxially to the inner conductor by means of an adhesive. Also in this embodiment a second annular or tubular ferromagnetic element 9 is secured to the inner conductor, for example, likewise by an adhesive and the capacitor 15 is connected to the inner conductor 1 between the two ferromagnetic elements by means of the resilient element 17. However, this embodiment differs from that of FIG. 1 in that the information signals are derived from the inner conductor 1 by means of a coil 20 and are applied thereto again by means of a coil 21. These coils in which each of their windings is located in a plane which is at least approximately parallel to the axis of the ferromagnetic elements are coupled in the manner shown in the Figure to these ferromagnetic elements 7 and 9.

To amplify the information signals to be transmitted the two free ends 22 and 22' of the coils 20 are DC coupled to the input terminals 11 and 11' of the repeater 4 whose output terminals 12 and 12' are DC coupled to the two free ends 23 and 23' of the coil 21. The coupling of the coils 20 and 21 to the respective ferromagnetic elements 7 and 9 is such that the windings of these coils comprise at least part of the magnetic lines of force present within the ferromagnetic elements. Thus the information signals are applied without mechanical interruption of the inner conductor by means of a transformer action of the ferromagnetic element 7 and the coil 20 coupled therewith to the repeater through this coil and the output signal of the repeater 4 is applied due to the transformer action of the element 9 and the coil 21 through this coil 21 to the inner conductor 1 following the ferromagnetic Although in the embodiment of FIG. 3 the coils 20 and 21 have only two windings, this number may be arbitrarily extended. Both in the embodiment of FIG. 1 and in that of FIG. 3 an additional number of annular or tubular ferromagnetic elements may alternatively be used which are coaxially secured to that section of the inner conductor which is located between the two ferromagnetic elements 7 and 9. In addition the ferromagnetic elements secured on a certain side of the support 5 to the inner conductor and secured coaxially with the inner conductor may be formed with mutually different magnetic permeabilities so that a cut-off filter having a very large bandwidth is realized.

What is claimed is:

1. A coaxial cable comprising: an inner conductor and an outer conductor; at least one line repeater having a pair of input and output terminals, said repeater being located in a cable section between said inner and outer conductor; a tubular ferromagnetic element coaxially mounted on and electromagnetically coupled to said inner conductor in front of said line repeater to provide, without a mechanical interruption of the inner conductor, an anterior electrical interruption for a broad frequency band of signals transmitted through the cable; and first means to couple the signal occuring in a cable section before said anterior electrical interruption to the input terminals of said line repeater, whereby the output terminals are coupled to a cable section behind said electrical interruption.

2. A coaxial cable as claimed in claim 1, wherein an additional, tubular ferromagnetic element is coaxially mounted on and electromagnetically coupled to said inner conductor immediately behind said line repeater to provide a posterior electrical interruption in the path of the signal, and second means to couple the signal occuring at the output terminals of said line repeater to a portion of said cable behind said posterior electrical interruption.

3. A coaxial cable as claimed in claim 2, further comprising a capacitor having one electrode connected to the part of said inner conductor between said anterior and posterior electrical interruptions, and the other electrode connected to said outer conductor.

4. A coaxial cable as claimed in claim 3, wherein the ferromagnetic elements providing said anterior and posterior electrical interruptions have mutually different magnetic permeabilities.

5. A coaxial cable as claimed in claim 2, wherein said first and second coupling means include conductors having resilient ends abutting against said inner conductor.

6. A coaxial cable as claimed in claim 3, further including a tubular support member of an insulating material coaxially mounted on said inner conductor between said first and second ferromagnetic elements, said support member having recesses for accomodating said line repeater and said capacitor, respectively.

7. A coaxial cable as claimed in claim 2, wherein said first and second coupling means include at least one coil inductively coupled to the magnetic field of at least one of said ferromagnetic elements.

* * * * *